United States Patent [19]

Koon

[11] Patent Number: 4,987,776
[45] Date of Patent: Jan. 29, 1991

[54] LEVEL INDICATOR

[76] Inventor: Terry D. Koon, 1601 N. Rhododendron Dr. #645, Florence, Oreg. 97439

[21] Appl. No.: 403,183

[22] Filed: Sep. 5, 1989

Related U.S. Application Data

[63] Continuation-in-part of Ser. No. 168,976, Mar. 16, 1988, Pat. No. 4,864,857.

[51] Int. Cl.$^5$ .............................................. G01F 23/26
[52] U.S. Cl. ................................ 73/304 C; 73/290 R; 340/612; 361/284
[58] Field of Search ......................... 73/304 C, 290 R; 340/612, 620, 618; 361/284; 324/61 P

[56] References Cited

U.S. PATENT DOCUMENTS

| | | | |
|---|---|---|---|
| 2,868,015 | 1/1959 | Haropulos | 73/304 C |
| 3,010,320 | 11/1961 | Sollecito | 73/304 C |
| 3,283,577 | 11/1966 | Schuck | 73/304 C |
| 3,321,971 | 5/1967 | Llewellyn et al. | 73/304 C |
| 3,862,571 | 1/1975 | Vogel | 73/304 C |
| 3,935,739 | 2/1976 | Ells | 73/304 C |
| 4,099,167 | 7/1978 | Pomerantz et al. | 73/304 C |
| 4,165,641 | 8/1979 | Pomerantz et al. | 73/290 R |
| 4,204,427 | 5/1980 | Goethe | 73/304 C |
| 4,266,144 | 5/1981 | Bristol | 73/304 C |
| 4,347,740 | 9/1982 | Townsend | 73/304 C |
| 4,347,741 | 9/1982 | Geiger | 73/304 C |
| 4,589,281 | 5/1986 | Aldrich | 73/290 R |
| 4,628,302 | 12/1986 | Barr et al. | 340/620 |
| 4,749,988 | 6/1988 | Berman et al. | 73/304 C |
| 4,788,488 | 11/1988 | Kramer et al. | 73/304 C |

Primary Examiner—William A. Cuchlinski, Jr.
Assistant Examiner—William C. Dowling
Attorney, Agent, or Firm—Dority & Manning

[57] ABSTRACT

A storage installation which is capable of storing a variety of free-flowing materials, both conductive and non-conductive, includes a level sensing device which may be disposed either exteriorly or interiorly thereof. The device has either one or a plurality of level sensor and sensor circuit pairs which are preferably disposed vertically within a non-electrically conducting tube which may be hermetically sealed from contact with the stored material. The level sensors comprise respective sensing capacitors, each having effectively a single plate construction. Grounded electrical contacts, if relatively adjacent, may comprise the other side of the effective sensing capacitor. Electrostatic force lines flow outward from the sensing capacitor(s), and are differentially interfered with by the presence or absence of materials or objects to be sensed. Such interference affects the dielectric constant of the respective sensing capacitor, which can in turn be detected to drive a level indicator display.

24 Claims, 5 Drawing Sheets

LEVEL INDICATOR

BACKGROUND OF THE INVENTION

This application is a continuation-in-part of U.S. application serial number 07/168,976, filed Mar. 6, 1988 now U.S. Pat. No. 4,864,857. Also, the disclosure of another co-pending application of the present inventor, U.S. application serial number 07/256,605, filed Oct. 11, 1988, is hereby incorporated herein by reference.

This invention relates generally to an improved level indicator for stored free-flowing material. More particularly, this invention relates to a level sensing device for sensing and displaying the level of free-flowing material (whether conductive or non-conductive in nature) stored within a storage compartment at a point relatively remote from the compartment itself.

Level gauges or sensing devices which indicate at remote points the detected level of material within storage compartments have long been known, but such gauges or detectors have been typically limited in the type of material whose level they can practically detect. Many level gauges require that the material whose level is detected be in electrical contact with the gauge itself, and some require that the material itself be electrically conductive.

Some examples of prior art level indicators are:

| U.S. PAT. NO. | INVENTOR(S) | DATE OF ISSUE |
|---|---|---|
| 4,165,641 | Pomerantz et al. | August, 1979 |
| 3,935,739 | Ells | February, 1976 |
| 3,862,571 | Vogel | January, 1975 |
| 3,321,971 | Llewellyn et al. | May, 1967 |
| 3,025,464 | Bond | March, 1962 |
| 3,010,320 | Sollecito | November, 1961 |
| 2,868,015 | Haropulos | January, 1959 |
| 2,751,531 | Barrett | June, 1956 |

In Haropulos, U.S. Pat. No. 2,868,015, a capacitive step level indicator for conductive liquids uses a plurality of vertically stacked capacitive elements in a tank, each energized through a respective relay. A plate in the storage tank completes a circuit through the received liquid. When fuel fills the tank, current flow through any relay is too small to operate it, and a bank of indicator lights remain illuminated ("tank full"). As fuel is withdrawn, conductive sea water replaces it and conducts adequate current to activate a relay and extinguish its corresponding lamp for indicating a diminished level of stored fuel.

An inherent drawback generally in such system is that it is operable only with electrically conductive filler fluids (i.e., the fluid which replaces the fuel), and is potentially dangerous with combustible fluids such as gasoline or the like.

Another approach is set forth in Ells, U.S. Pat. No. 3,935,739, wherein a liquid level gauging apparatus includes an upright conducting probe adapted to be immersed in a liquid adjacent to a series of vertically spaced electrodes, closely adjacent to the probe itself. Each of the electrodes constitutes one plate of a capacitor, with the other plate formed by the single upright conducting probe. When a particular electrode is above the level of fluid in a tank, the magnitude of the A.C. signal received at that electrode is of a significantly smaller magnitude, which provides only a low level drive voltage to its respective comparator amplifier. The device has a circuit which sums the signals received from each of the capacitor plates to generate a meter reading which corresponds to the number of electrodes submerged in the stored liquid at a particular time, and thereby provides an indication of the liquid level in the tank.

The Ells device apparently requires that the stored fluid be in contact with his electrodes, and that the material be a liquid which has a dielectric constant greater than air. Contact could prove hazardous if used with combustible materials.

Still another approach is found in Vogel, U.S. Pat. No. 3,862,571, which discloses a multi-electrode capacitive liquid level sensing system which also apparently requires electrical contact between a series of probes and the fluid whose level is being detected. Preferably, at least three probes of different lengths extend to different depths within the liquid itself.

U.S. Pat. Nos. to Sollecito, 3,010,320; Bond, No. 3,025,464; Llewellyn et al., No. 3,321,971; and Barrett No. 2,751,531 each generally relate to level measuring devices for liquids and each utilize electrical contact between the liquids and portions of their various sensing devices themselves; hence, such devices generally suffer from the same drawbacks noted above with reference to the other patents requiring electrical contact between the fluids being measured and the various probe members.

Another liquid level sensing means is found in Pomerantz et al., U.S. Pat. No. 4,165,641. While direct electrical contact is not apparently required between the probe and the liquid or fluid whose level is being determined, the fluid whose level is being detected must be conductive to some extent, such as a fluid having an electrical resistivity of up to 20 megohm-centimeters. Thus, this device is only operable with limited types of material such as at least partially conductive materials.

SUMMARY OF THE INVENTION

The present invention recognizes and addresses various drawbacks of prior art level indicators, such as those noted above and others. Accordingly, it is one general object of this invention to provide an improved level indicator.

It is another general object of the present invention to provide an improved level indicator, which can be operable with a variety of materials, either conductive or non-conductive. It is another present object to not require electrical contact with the materials which are being detected, so that a device in accordance with this invention will be safe for use even with volatile materials, such as fuel.

Another object is to provide an improved device operable with dry goods, such as rice, beans, grain, or flour, as well as liquid goods. It is a further object to provide a probe which outputs DC-based signals (instead of high frequency-based signals) to virtually eliminate the need for adjustments during field installations to compensate for stray capacitance or inductance.

It is a more particular present object to provide a level sensing device which is hermetically sealed within a non-conductive tube for determining and remotely indicating the level of a variety of free-flowing materials stored within a compartment. In providing such a sealed embodiment of the invention it is an object to virtually eliminate adverse affects of product buildup and bridging that occurs when slime, moss, or other growth causes the loss of insulation between sensing elements of non-sealed prior art devices.

It is still another object of the invention to provide a storage installation with a level sensing device for safely sensing the level of a variety of free-flowing materials within the compartment and safely indicating such determined level at a point relatively remote from said compartment.

It is yet another object of the invention to provide a storage installation, which is equipped with a level indicator which is hermetically sealed from the material stored within the compartment, and which will gauge the level of such material whether it be of a fluid or a dry nature, and whether it be electrically conductive or non-conductive.

Various features and aspects of this invention may be combined in particular constructions forming embodiments in accordance with the present disclosure. One such exemplary embodiment includes a completely sealed, multiple-point level sensing apparatus for use in conductive or non-conductive medium, without electrical contact with such medium, such apparatus comprising: sealed housing means for disposition in a storage tank holding a stored medium, the quantity of which is to be measured by detecting the level thereof in such storage tank, such housing means having at least one end thereof extending generally out of such tank, with such one end having an opening therein for passage of electrical conductors; and a plurality of sensing circuit means supported within the housing means at predetermined, spaced intervals therein, so as to be situated at respective levels within a storage tank; wherein each of the sensing circuit means includes a respective preferably cylindrical capacitor component forming one side of a main sensing capacitor thereof, and a respective grounded component spaced from the cylindrical capacitor component and electrically associated therewith for forming the other side of its respective main sensing capacitor, the sensing circuit means being responsive to changes in the effective dielectric constant of each of the sensing capacitors between the paired cylindrical and grounded components thereof caused by the relative absence or presence of stored medium adjacent thereto outside of the sealed housing means, and responding to such changes by outputting respective signals indicative of the level of the stored medium in the storage tank.

Another present exemplary embodiment concerns a storage installation for storing a variety of free-flowing materials and having a level indicator for remotely indicating the level of material stored within the installation, comprising: a storage compartment adapted to store free-flowing material; a level sensing device disposed within the storage compartment and generally transversing the full vertical height thereof, and having a plurality of paired level sensors and circuits disposed at spaced intervals within a nonelectrically conductive tube, hermetically sealed from contact with the free-flowing material within the storage compartment; and remote, level-indicating display means connected to the respective circuits within the hermetically sealed tube, for indicating the level of free-flowing material stored within the storage compartment.

Yet another present exemplary embodiment is directed to a vertical level sensing device for sensing the presence of a flowing material at a plurality of levels in a storage structure, comprising: a plurality of vertically-spaced sensing capacitors have respective upper plates defined by cylindrical, hollow metallic members, and corresponding respective lower plates defined by inductance coils connected to ground; a sensor circuit associated with each of the sensing capacitors to form a plurality of level sensing means for generating a DC signal indicative of whether material is present at the corresponding vertical level of that sensor circuit relative a storage structure; tubular means completely surrounding the plurality of sensing capacitors and hermetically sealing said capacitors and sensing means from contact with the free-flowing material to be sensed; and indicating means for receiving signals generated the sensing means and indicating the level of free flowing material in the storage structure.

Those of ordinary skill in the art will recognize various modifications and substitutions of equivalent features and means which can be practiced with the foregoing embodiments, all which variations are intended to come within the spirit and scope of the present invention by virtue of present reference thereto. Moreover, other embodiments of this invention may be formed by constructions including various different combinations of present features, which combinations differ from the foregoing exemplary embodiments. Further aspects and features of this invention, as well as additional details thereof, follow hereinafter.

BRIEF DESCRIPTION OF THE DRAWINGS

A full and enabling disclosure to those of ordinary skill in the art of the present invention, including the best mode thereof, is set forth in the following specification, with reference to the appended drawings, in which.

Repeat use of reference characters in this specification and the appended drawings is intended to represent same or analogous features or elements of this invention.

DETAILED DESCRIPTION OF THE PREFERRED EMBODIMENTS

Figure 1:
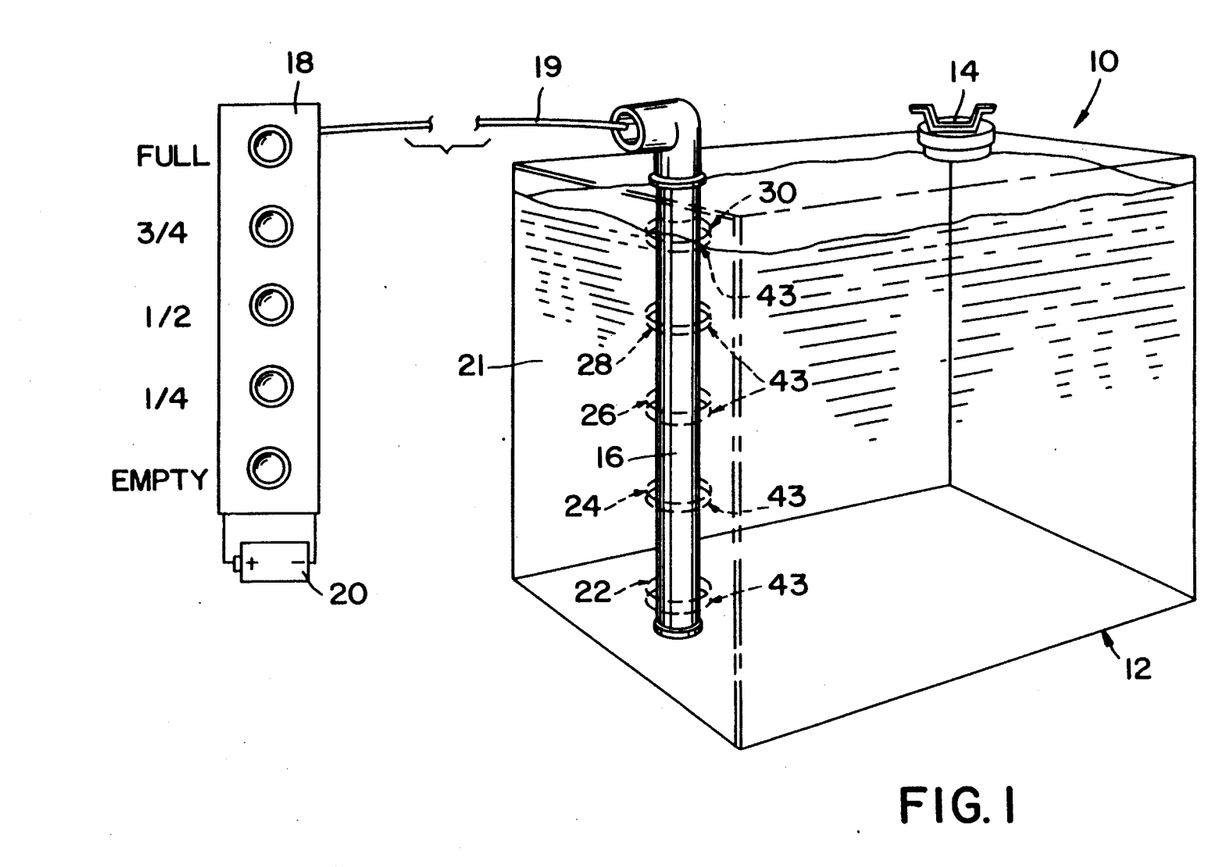
FIG. 1 is a perspective diagrammatic view (in partial cutaway) of a storage installation incorporating an exemplary level indicator of this invention.
Figure 2:
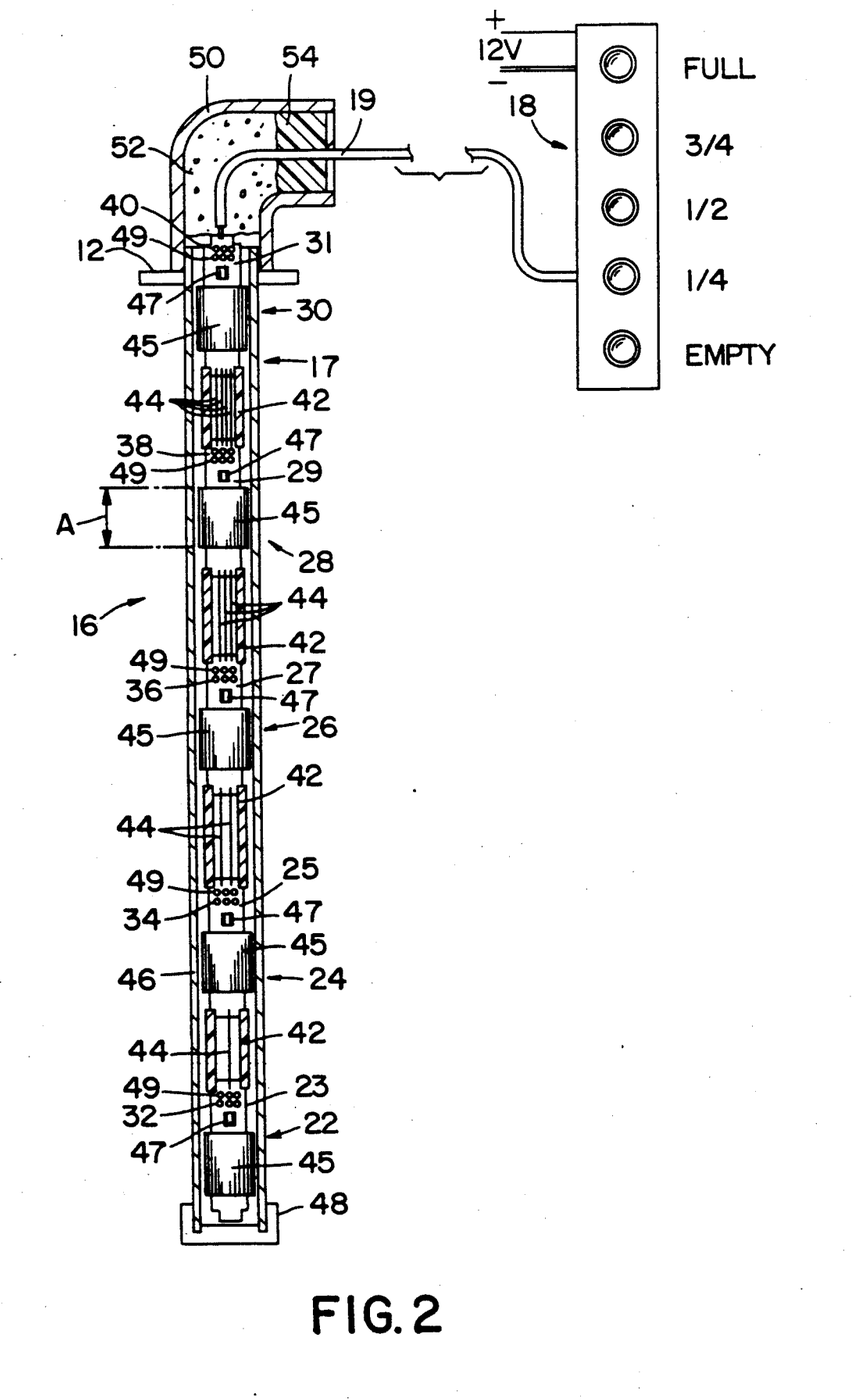
FIG. 2 is a diagrammatic cross-sectional view of an exemplary sensing device of this invention, generally indicating structural details thereof.

FIGS. 1 and 2 illustrate a storage installation having a level indicator for indicating the level of a free-flowing material stored within a compartment. Storage installation 10 comprises a storage compartment 12 which may be for example a tank with walls for storing fluids, or a silo for storing grain, or a container for anY other free-flowing material (conductive or non-conductive). For example, storage compartment 12 could be a storage bin for storing plastic pellets or the like. Storage compartment 12 has a filling cap 14 or equivalent structure whereby free-flowing material can be added to the compartment. Other openings (not shown) such as a fitting at the bottom may be used for removal of stored materials.

Inserted within storage compartment 12 is a level indicator 16 (preferably in a vertical posture 17).which has a plurality of material level sensors 22, 24, 26, 28, and 30 which are arranged vertically within storage comPartment 12 at spaced intervals. An absolute vertical orientation for indicator 16 is not required, so long as multi-point sensors have relative vertical spacing. Each of sensors 22, 24, 26, 28, and 30 effectively has a main sensing capacitor and corresponding sensor circuit which creates an electrostatic force field. The field preferably penetrates the walls of indicator 16 to sense the presence or absence of free-flowing material 21 within the compartment therearound. The manner of detection will be explained in more detail hereinafter with reference to FIG. 3 of the drawings.

Whenever one of sensors 22, 24, 26, 28, or 30 senses the presence of material relatively adjacent thereto (as described below), a signal is transmitted through indicator cables 19 to a level indicating means (register 18) to light up one-or more of the lights on the register so as to indicate whether the storage compartment is full, partially full, or empty, as the case may be. For example, if the level of the free-flowing material rises only as high as sensor 26, the lights for empty, ¼ full, and ½ full will be lighted to indicate that the compartment is half-filled. Of-course, it-is to be understood that the lights on register 18 could be made to light whenever the material is absent rather than when it is present, or other display operations could be practiced. In general, the operation and selection of various alternative display means are known to those of ordinary skill in the art, and need not be repeated herewith in detail for an enabling understanding of the present invention.

Referring now to FIG. 2 in particular, it will be noted that sensors 22, 24, 26, 28, and 30 of level indicator 16 are represented as disposed on circuit boards 23, 25, 27, 29, and 31, respectively, and further on which respective circuits 32, 34, 36, 38, and 40 are disposed. Each pair of circuits and sensors are-spaced vertically from adjacent other such pairs, preferably by a plastic tubular spacer 42 or the like. Each of the sensor circuits in this particular embodiment is wired directly into the level indicating register 18 by means of its own circuit line 44, which lines collectively form cable 19. Each of the sensor circuits includes a cylindrical capacitor component 45 which is a part of the-main sensing capacitor of the level-sensor. Component 45 may effectively form one plate of such-sensing capacitor. The axial length A of such cylindrical components 45 may be varied, preferably between about ¾" to about 2". The cylindrical component 45 may comprise a hollow piece of brass shim, which preferably has a very sharp edge about its periphery. Such sharp edges create strong concentrations of static force lines emanating therefrom, which in this instance can penetrate the walls of indicator 16 for detecting material as represented by force lines 43 of present FIG. 1.

Another circuit element such as coil 47 (shown by representation) or some other circuit elements 49 any one of which being grounded, may serve as the lower or other plate of the effective main sensing capacitor. Where the inductor coil 47 so serves, it preferably is centrally mounted relative its corresponding cylindrical component 45 with which it is electrically coupled, and further preferably about ¼" thereabove.

The vertical array of sensors, circuits and spacers 42 is advantageously disposed within a hermetically sealed pipe 46 which has a sealed cap 48 on its lower end for sealing same. Pipe 46 is preferably non-conductive, such as PVC pipe (though other materials may be used). The upper end of pipe 46 has an elbow 50 into which is placed packing 52 (for example, foam rubber or other foamed products), and the end of elbow 50 is sealed such as with an epoxy resin 54 which secures cable 19 and fixes the spacing of the level sensors.

Figure 3:
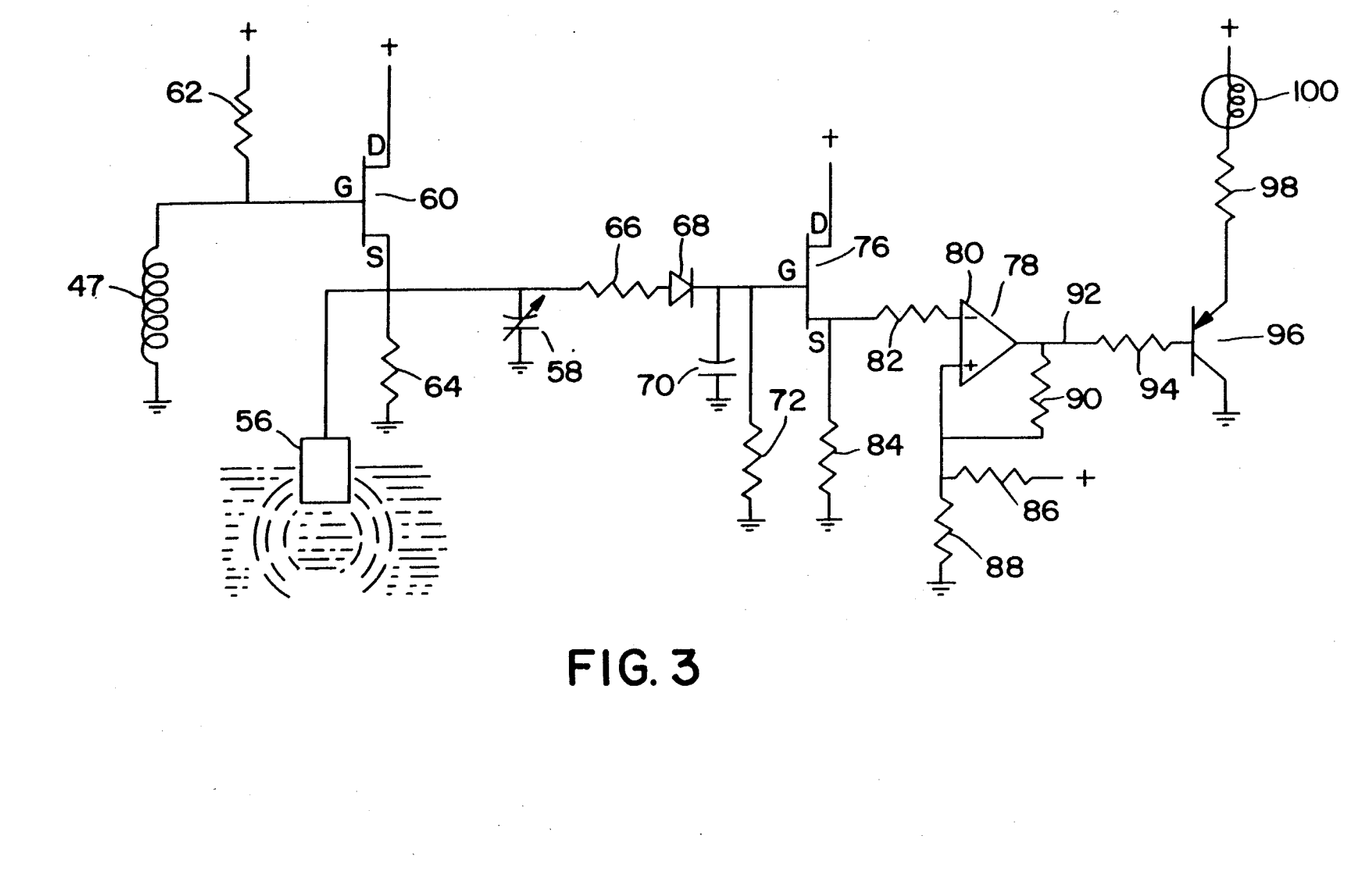
FIG. 3 is an exemplary schematic circuit diagram for use with the level indicator such as illustrated in FIG. 2, as discussed hereinafter.

Referring now to FIG. 3 of the drawings, an exemplary sensor circuit 40 is illustrated in detail. Inductor coil 47, capacitor plate 56 (which may be the cylindrical capacitor component 45 shown in FIGS. 1 and 2), variable capacitor 58 and the inner-element capacitance of FET 60 form a high-Q oscillator. Such oscillator preferably operates in a range of from about 2 to about 400 kilohertz, in order to provide an effective range for sensing either conductive or non-conductive materials. Higher frequencies above 400 kilohertz generally improve sensitivity to conductive materials relative non-conductive materials. In general, the preferred operating frequency will be relatively near the natural resonance of coil 47, since FET 60 is utilized in a source follower configuration (as illustrated) having a gain of less than unity. When energized, current flows through coil 47 and resistor 62 allowing initial current to flow through resistor 64, FET 60, and the capacitance of elements 56 and 58.

Upon such current flow, oscillations begin immediately, due to the natural resonance of coil 47. The resulting voltage fluctuations of the gate of FET 60 cause FET 60 to act as a voltage controlled resistance allowing voltage fluctuations across resistor 64, capacitor component 56 and capacitor 58. The heart of the oscillator is a junction FET 60 which provides extremely high DC isolation between coil 47 and resistor 64, allowing the maintenance of high-Q natural resonance oscillations across coil 47. The series parallel circuit of capacitor component 56, capacitor 58, and the inner-element capacitance of FET 60 causes the oscillator to oscillate at a point between the bottom and the top of the Q-curve of the high-Q oscillator. Any substance brought into close proximity with cylindrical capacitor component 56 that affects the dielectric constant between cylindrical capacitor component 56 and a given corresponding capacitor component, such as coil 47, will cause the oscillator to shift to a different point on the Q-curve, thereby producing a change in the amplitude of the oscillation voltage across resistor 64.

Resistor 66, coupling diode 68, capacitor 70, and resistor 72 form a decaying peak detector for converting the fluctuating oscillation voltage across resistor 64 into a DC voltage at the gate of FET 76. This DC voltage fluctuates directly proportional to the change in the dielectric constant of the effective sensing capacitor (eg., components 56 and 47) when a free-flowing material is brought into proximity with such components.

Element 76 is also a junction FET which provides high impedance isolation, allowing low impedance signal handling at the source of FET 76 without affecting the oscillator or the peak detector circuits.

The open loop gain operational amplifier 78 functions as voltage comparator means for providing output switching. This switching occurs when the input signal at the inverting input 80 through a parallel resistor construction 82 and 84 coincides with the voltage selected by the voltage divider network formed with resistors 86 and 88. Of course, selection of such resistors or use of a variable resistance may be used to vary the comparison voltage level, selection of which can influence the sensitivity of the resulting device and/or adapt same for use with particular materials. Resistor 90 provides hysteresis in the operation of the voltage comparator means to provide fast and noiseless triggering on output 92 thereof. Such output 92 flows through a resistor 94, a transistor 96, and an output resistor 98, which comprise a conventional current switch which lights up the appropriate light (such as light 100) on a display means such as the level indicating register 18.

It will be understood that each of the sensors preferably has the circuit of FIG. 3 and functions in the same manner regardless of the material stored within the compartment. Such materials can be fluids of any type or dry free-flowing material of any type. Pipe 46 can generally be of any material that is not corroded by the material into which it is inserted. Ordinary PVC water pipe has been found suitable for most materials.

Various alternatives, though not illustrated or discussed above, may be practiced by those of ordinary skill in the art. For example, it will also be understood that any number of level sensors may be used to detect at as many levels in a stored material as may be desired. Likewise, resolution of the accuracy of such detections will depend on the selected separation between adjacent sensing capacitor/circuit pairs. The shape of the sealed sensing pipe may be made conical instead of cylindrical, or some other shape. An adjustable multi-point device may be provided with plural effective sensing capacitors, but only one central circuit instead of respective, plural circuits. In such case, the control circuit could be adapted for handling multiple inputs, such as on a sequential basis. A non-linear placement of sensors along the device may be compensated for by circuitry to render a linearly-related display. Likewise, the probe need not be vertically placed in a storage compartment, but may be placed at some angle, or equivalent placement.

Further modifications to the foregoing level indicator, as well as that of co-pending U.S. application Ser. No. 07/256,605 (the disclosure of which is incorporated herein by reference) are disclosed hereinafter with reference to FIGS. 4 through 7C. In particular, it has been surprisingly determined that an apparatus for sensing or detection, and having considerable sensitivity, may be obtained even without use of a peak detector in the circuit to convert oscillatory signals to a DC voltage level output. Furthermore, the improved apparatus further disclosed hereinafter may be used with a "single-sided" capacitor means or its equivalent, either exteriorly or interiorly of a container. It may also be used as a single point detector, or to detect over a larger range, even without necessarily requiring multiple capacitor means.

Figure 4:
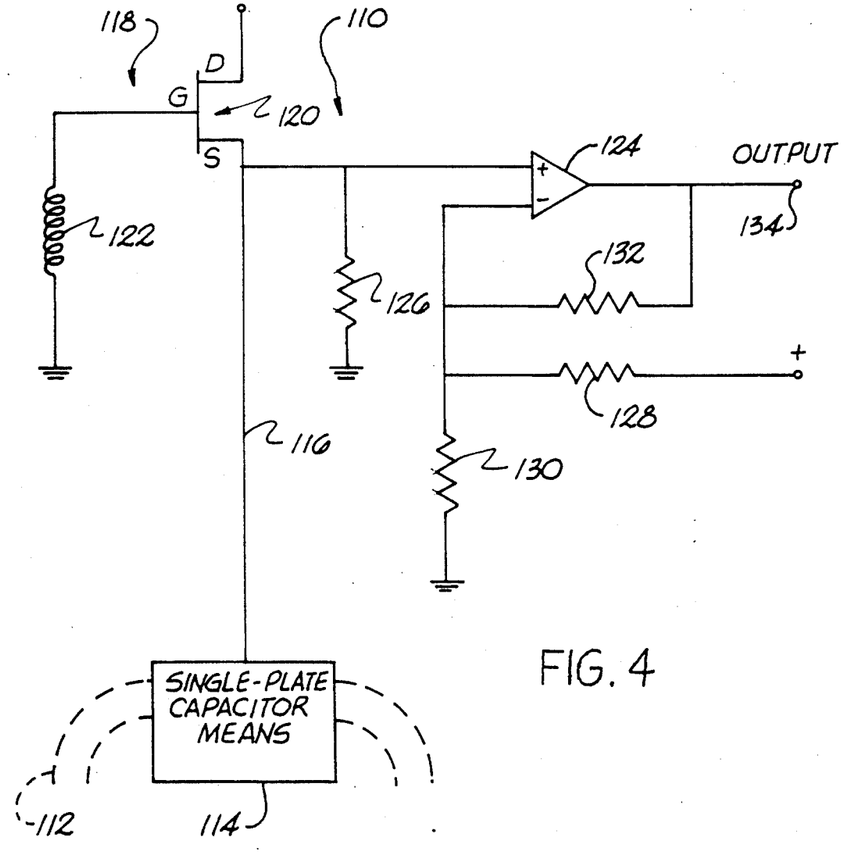
FIG. 4 is an exemplary schematic circuit diagram of a still further embodiment in accordance with this invention.

Present FIG. 4 provides an enabling disclosure in detail of a specific exemplary operative embodiment in accordance with these further aspects of this invention. In particular, apparatus 110 provides sensing or detection, such as for materials in a container or for objects. An electrostatic field 112 is generated, similar to the field associated with capacitor plate 56 of present FIG. 3, or sensing element 13 of probe 12 of co-pending application Ser. No. 07/256,605.

Exemplary constructions of single-plate capacitor means 114 are discussed hereinafter in detail. Preferably, a relatively short connecting wire 116 interconnects single-plate capacitor means 114 with an oscillator circuit means 118. Such oscillator circuit means outputs an oscillatory signal, and may take different forms, but preferably comprises a junction FET 120, with its gate connected to an inductance coil 122, its drain connected to a power supply, and its source connected to capacitor means 114 through connecting wire 116. The source of J-FET 120 is preferably also connected to the non-inverting input of an operational amplifier 124.

Op amp 124, as configured in exemplary operative embodiment 110, provides primarily gain and level set. In such configuration, a resistor 126 is connected to ground, and provided in parallel with the source of J-FET 120 to the non-inverting input of op amp 124. Resistors 128 and 130 provide voltage division relative the power supply to resistor 128, and are in parallel with a further resistor 132 (connected with the output of op amp 124) to the inverting input of op amp 124. The output 134 of op amp 124 is also representatively illustrated in the graph of FIG. 5.

The exemplary operative embodiment 110 of present FIG. 4, for example, omits peak detector circuitry, such as resistor R2, coupling diode D1, capacitor C3, and resistor R3, of the FIG. 2 embodiment of copending application Ser. No. 07/256,605. It has been determined, particularly with the presence of diodes, that the peak detector circuitry may be excessively temperature sensitive. It was surprisingly learned, upon attempting to relocate the peak detector function to the output side of the op amp, that a DC voltage level output nonetheless occurred at output 134. As indicated on the vertical axis of the graph of FIG. 5, increases in relative proximity of the sensor apparatus to material or fluid to be detected or sensed result substantially in linear fashion to relative increases in the DC voltage appearing at output 134 (shown on the horizontal axis of such graph). The exact operational details of the exemplary operative circuit of present FIG. 4 have not yet been fully accounted for. However, the functionality of a circuit constructed as illustrated has shown to be highly repeatable, and to have superior detection sensitivity and increased temperature stability.

Exemplary values for the circuit components of FIG. 4 are as follows. Inductance coil 122 is preferably small, such as approximately ¼ of an inch, and has a value of approximately 12 milli-henries. The power supply to the drain side of J-FET 120 may be various values, such as generally from a range of about five to about eighteen volts. For the oscillator circuit means, an oscillatory frequency of approximately 400 KHz is preferred. Resistor 126 preferably has a value of about 400 K ohms. The input impedance to op amp 124 is very high. The preferred value for resistor 128 is 68K ohms, for resistor 130 is 100 K ohms, and for resistor 132 is 200 K ohms. The single-plate capacitor means may comprise various constructions, for example such as a ½ inch wide flat piece of brass shim stock.

Figure 5:
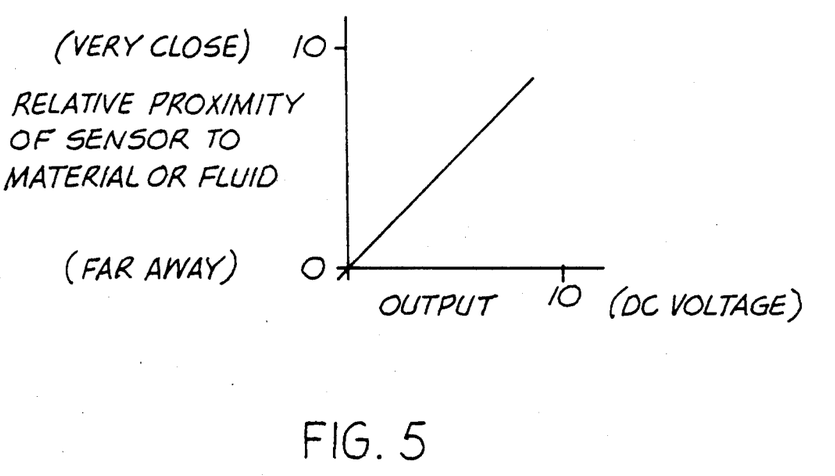
FIG. 5 is an exemplary output diagram representative of a relative output characteristic of a given embodiment in accordance with the construction of FIG. 4.

Based on the foregoing exemplary construction of apparatus 110, it could ordinarily be expected that a 400 KHz signal would appear at output 134, but instead a DC voltage level output appears, as represented on the horizontal axis of the graph of FIG. 5. Changes in the relative proximity of sensed materials to capacitor means 114 differentially influences electrostatic field 112, for varying the DC voltage level output, based on principles similar to that operating in connection with the apparatuses of FIGS. 1 through 3, and to that disclosed in the copending application Ser. No. 07/256,605. The advantages of apparatus 110 are many, and include the simplicity with which a highly sensitive circuit is provided which also converts an oscillatory input into a DC output.

It is further preferred that the op amp and related components be mounted relatively closely together on a circuit board, and that their size and surface area be minimized. The same is true for connecting wire 116 relative the surface area of capacitor means 114. Since wire 116 interconnects the oscillator circuit means 118 with sensing element means or capacitor means 114 (which collectively comprise an oscillator sensing means), wire 116 acts in effect as part of the sensing element. An excessive size of wire 116 relative capacitor means 114 would thus undesirably interfere with operation of apparatus 110. One exemplary relative size which functions properly is use of an eight inch piece of shim stock or other metallic surface element with an approximately two inch lead or wire 116.

Another preferred aspect of apparatus 110 is that the oscillator circuit means comprises a J-FET 120, coupled with the other, related components as shown. It is a typical characteristic of J-FET's that they have a high input impedance, which is preferred for apparatus 110. Even within the family of J-FET's, it is preferred that the apparatus 110 be used with a J-FET having low $V_{GS}$ cut-off voltage, such as nominally minus one volts, with minus four volts maximum. It is also preferred that J-FET 120 have a low Crss (common source reverse transfer capacitance), with a typical value of about 1.9 pico-Farads, and a preferred maximum of 2.5 pico-Farads. It is still further preferred that J-FET 120 have a low Ciss (common source input capacitance), with a typical value of approximately 4 pico-Farads, and maximum value of 5 pico-Farads. Those of ordinary skill in the art already appreciate that J-FET's typically have very low inter-elemental capacitance when active. It should also be appreciated that "preferred" values and components are just that, and that broader aspects of the present invention are not limited strictly to such "preferences", which are disclosed so as to provide detailed, operative examples.

One alternative to the present exemplary embodiment of apparatus 110 of FIG. 4, is that the source of the J-FET may be placed directly into a voltage comparator. In such construction, the op amp may be used as open loop gain, with the source of the J-FET connected to the inverting input of the op amp, and with a voltage divider network (comprised for example of two resistors in parallel) connected between the non-inverting input of the op amp and a power supply. Such alternative configuration is generally represented by the relative configuration of FET 2 and op amp 45 in FIG. 2 of co-pending application Ser. No. 07/256,605.

In the alternative, it is still further possible to use a single voltage comparator for developing an analog signal, or to use plural voltage comparators, for example to drive plural, discrete level indication lamps. Thus, the embodiment of FIG. 4 may be, in the alternative, variously practiced in combination with indicator means as discussed or suggested above with reference to FIGS. 1 through 3, or as discussed or suggested in connection with co-pending application Ser. No. 07/256,605.

Figures 6A, 6B:
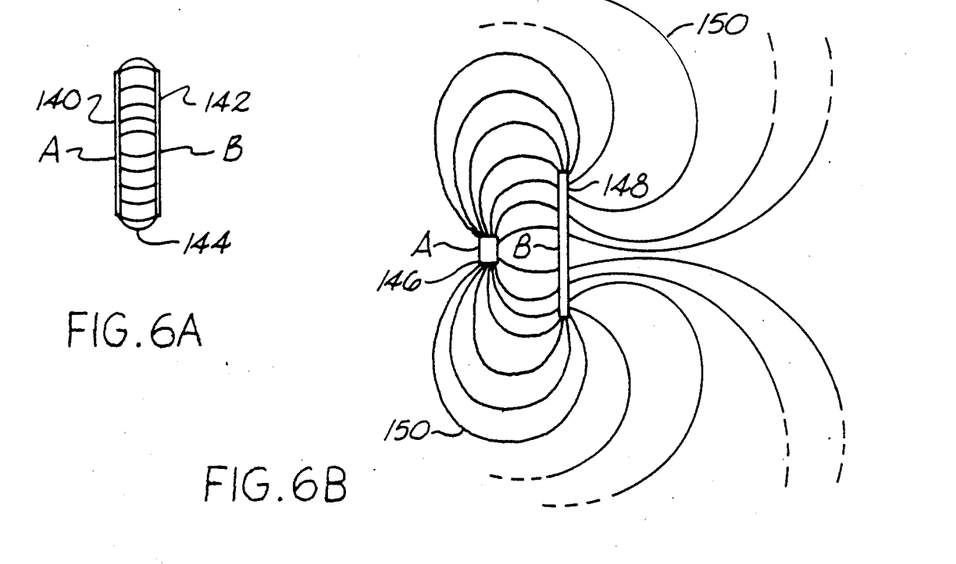
FIGS. 6A and 6B are representational examples of certain capacitance-type characteristics, useful in explaining and understanding certain aspects of the present invention.

Referring now to present FIGS. 6A and 6B, electrostatic force lines are representatively illustrated with two different models of capacitive-type elements. In FIG. 6A, two separate capacitor plates 140 and 142 (in a generally conventional construction) are associated with separate input leads or sides A and B. Electrostatic lines of force 144 may be generated generally between the capacitor plates, as understood by those of ordinary skill in the art. In such construction as in present FIG. 6A, the relatively similar size and close proximity of the two plates 140 and 142 will generally inhibit external objects from influencing the electrostatic field, and thus the effective capacitance of such construction.

In FIG. 6B by comparison, capacitor components 146 and 148 are illustrated. The purpose of FIG. 6B is to generally represent what begins to happen as a "single-sided" or "single-plate" capacitor means is provided. Element 148 may be thought of as a single capacitor plate, such as or similar to plate 142. However, element 146 is greatly relatively reduced in size and surface as compared to its corresponding element 140. Element 146 may comprise a small amount of close proximity metal wires, windings, foils, etc., otherwise associated with circuitry with which element 148 is utilized. As the relative size of element 146 is greatly decreased and is removed from element 148, the electrostatic lines of force 150 become more wide spread and diverse. The lines of force radiate in a highly dispersed manner, extending far beyond the single plate 148, thereby allowing external objects to greatly influence the electrostatic structure, and hence the capacitance of the construction of present FIG. 6B. Such differential influence is utilized in the present invention for sensing purposes, as alluded to above.

With practice of the present invention, in affect a single-plate capacitor means or its equivalent is provided for producing a large, dispersed electrostatic field, which is influenced by external, disassociated objects, that are thus detected by their relative proximity to the single plate. If in fact a single plate capacitor device is not in each instance utilized, the embodiments in accordance with present invention operate in such fashion as to simulate such characteristics of a single plate capacitor or its equivalents.

Figure 7A:
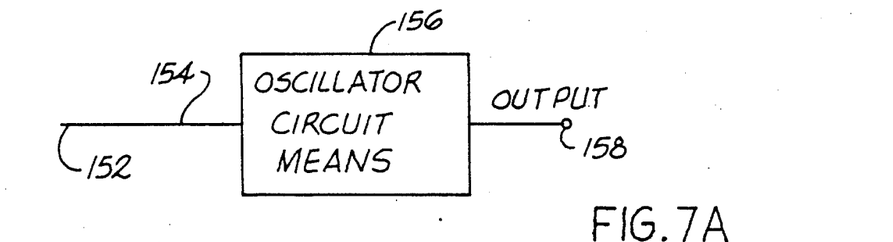
FIGS. 7A, 7B, and 7C are diagrammatic examples of various alternative oscillator sensing means in accordance with this invention.
Figures 7B, 7C:
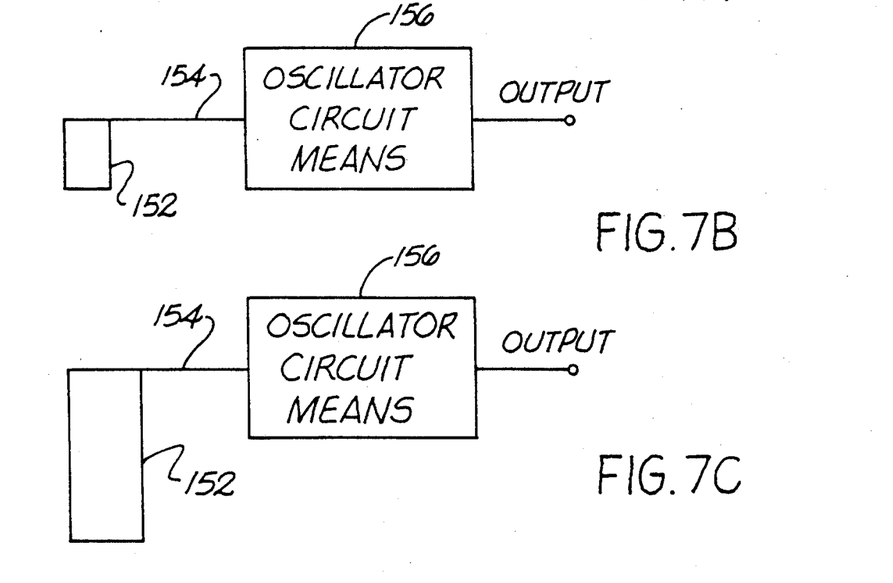

The exemplary constructions of present FIGS. 7A, 7B, and 7C illustrate various alternative features which may be practiced in accordance with this invention. In FIG. 7A, the sensing element or capacitor means in accordance with the present invention essentially comprises a metallic surface object in the form of a piece or segment of sensing wire 152, with either a very short or non-existent connecting wire 154 interconnecting member 152 with oscillator circuit means 156. Those of ordinary skill in the art should keep in mind that the illustration of present FIGS. 7A through 7C is highly diagrammatical, and various alternate constructions and features may be likely utilized during actual application of the invention. Such oscillator circuit means may comprise for example, the exemplary J-FET circuit referenced above in present FIG. 4. The output 158 of such oscillator circuit means is then fed to an output circuit means, for example such as the exemplary op amp circuitry 124 of apparatus 110.

With the exemplary construction of present FIG. 7A, the presence of materials or given objects may be monitored or detected from the perspective of a single point.

The exemplary embodiment of present FIG. 7B represents a sensing element means 152 comprising a metallic surface sensor in a form such as a metallic plate. With relatively increased surface area over the metallic surface sensor comprising a sensing wire (in FIG. 7A), greater sensitivity is obtained. A connecting wire 154 may be again utilized for connecting sensing element or capacitor means 152 with oscillator circuit means 156. Present FIG. 7C represents an embodiment wherein the metallic surface sensor or single-plate capacitor means 152 comprises a relatively elongated metallic plate in comparison with that of FIG. 7B. Such again relatively increased surface area provides still increased sensitivity, and permits continuous level reading over a relatively large container with which the apparatus may be used (either exteriorly or interiorly). Again, connecting wire 154 and oscillator circuit means 156 are utilized.

While present FIGS. 7A through 7C suggest specific embodiments and constructions in accordance with the present invention, the metallic surface sensor 152 may be of virtually any size, construction, or design, as required for use in a particular application. However, connecting wire 154 is preferably as short and as small as possible relative sensor 152, so as to eliminate or reduce the ability of wire 154 to detract from the reaction of sensor 152 to a given fluid or mass. Likewise, all other components such as the oscillator, and electronic components such as capacitors, resistors, transistors, integrated circuits, printed circuits, wires, cables, and any other metal objects associated therewith or in close proximity to the sensor and oscillator that are connected to ground or coupled to ground by stray capacitances, are to be constructed to and held to the relatively smallest surface area possible. This further contributes to the greatest differential in surface area and size between the sensor and all other metal objects, providing the best sensitivity possible to the materials or objects to be sensed. In affect, such constructions will enable the electrostatic field being radiated from the sensor 152 to be as highly dispersed as possible, and as highly reactive as possible to the fluids or masses being detected or sensed.

As an example of a metallic surface sensor 152, a ¾ inch strip of brass shim stock twenty inches in length was suspended in the center of a room with an oscillator circuit means 156, and was able to detect the presence of a person at a distance of one or two feet from such single-plate capacitor means. In certain embodiments, it may not be possible or desirable to construct a capacitor means that is truly single-plated. However, it should be possible in most instances to construct a capacitor means in accordance with the present invention or its equivalent, so that a single plate thereof is much larger in mass and surface area than surrounding metal or conductive materials, thereby allowing the relatively large, single plate to radiate electrostatic lines of force that must attempt to find such other "plate" or plates. In general, the greater the difference in size between the single large "plate" (or equivalent component) and the "other" component (which may be various circuit elements such as circuit board foil, interconnecting wires, windings on coils, etc.), the greater the electrostatic field extends from the single plate and the more influential other objects will be on the electrostatic structure. Hence, the greater the change will be in frequency of an oscillator as such differential conditions are encountered, thereby affording relatively increased sensitivity.

The apparatus 110 of exemplary present FIG. 4, and other embodiments of such aspects of this invention, may be used interiorly of a container, as represented by present FIG. 1, or exteriorly of a container, as represented by FIG. 1 of co-pending application Ser. No. 07/256,605.

The foregoing description is intended by way of example only. It is to be understood that changes, alternatives, modifications and the like, may be made in the invention as described and illustrated hereinbefore without departing from the spirit and scope of the claims appended hereto.

What is claimed is:

1. A sensing apparatus, comprising:
   oscillator sensing means having an oscillator circuit means for outputting an oscillatory signal and a sensing element means associated therewith for radiating an electrostatic field therefrom during operation of said oscillator circuit means, said oscillator sensing means providing a sensing signal output having a voltage level which varies in proportion to changes in such electrostatic field caused by reactions thereof to the proximity of material or object to be sensed; and
   output circuit means, responsive to said sensing signal output from said oscillator sensing means, for outputting a voltage level indicative of the proximity of the sensed object or material to said sensing element means; wherein
   said oscillator sensing means further includes a connecting wire interconnecting said oscillator circuit means and said sensing element means, and wherein said connecting wire has a relatively smaller surface area than said sensing element means so as to minimize interference therewith.

2. A sensing apparatus as in claim 1, wherein said voltage level from said output circuit means is a DC voltage, and said output circuit means comprises an operational amplifier with said sensing signal output from said oscillating sensing means connected to the non-inverting input of such operational amplifier.

3. A sensing apparatus as in claim 1, wherein said sensing element means comprises a metallic surface sensor.

4. A sensing apparatus as in claim 3, wherein said metallic surface sensor comprises a section of sensing wire.

5. A sensing apparatus as in claim 3, wherein said metallic surface sensor comprises a metallic plate.

6. A sensing apparatus as in claim 5, wherein said metallic plate is relatively elongated.

7. A sensing apparatus as in claim 1, wherein said sensing apparatus is adapted to be received exteriorly of a container for measuring the level of stored materials therein.

8. A sensing apparatus as in claim 1, wherein said sensing apparatus is adapted to be received interiorly of a container for measuring the level of stored materials therein.

9. A sensing apparatus as in claim 1, further including indicator means, responsive to said voltage level from said output circuit means, for indicating the level of materials within a container with which said sensing apparatus is associated.

10. A sensing apparatus as in claim 9, wherein said indicator means includes at least one voltage comparator means for comparing said voltage level with a predetermined voltage level.

11. A sensing apparatus as in claim 1, wherein said oscillator sensing means includes a plurality of said sensing element means for radiating respective electrostatic fields therefrom for sensing the presence of subject materials or objects at different locations.

12. Detection apparatus, comprising:
   oscillator circuit means for outputting an oscillatory signal;
   a single-sided capacitive element;
   a connecting wire, coupling said capacitive element to the output of said oscillator circuit means, and having a smaller surface area than said capacitive element; and
   an operational amplifier, having a non-inverting input thereof connected with said oscillator circuit means output;
   wherein said operational amplifier has a DC voltage level output which is proportional to the relative proximity of given materials to said capacitive element, with variations in such relative proximity influencing the electrostatic field emanating from said capacitive element during operation of said oscillator circuit means, whereby such variations in relative proximity are detected.

13. Detection apparatus as in claim 12, wherein said capacitive element comprises a metallic surface element.

14. Detection apparatus as in claim 12, wherein said apparatus is associated with a container for determining the level of materials therein, by which materials the electrostatic field from said capacitive element is differentially influenced, resulting in corresponding changes in said DC voltage level output.

15. Detection apparatus as in claim 14, wherein said apparatus is substantially interiorly associated with a container.

16. Detection apparatus as in claim 14, wherein said apparatus is substantially exteriorly associated with a container.

17. Detection apparatus as in claim 14, further including output indicator means, responsive to said DC voltage level for indicating different levels of materials within the container.

18. Detection apparatus as in claim 14, further including a plurality of such capacitive elements for respectively emanating electrostatic fields from their respective locations.

19. Apparatus for sensing the level of conductive or non-conductive materials stored in a container, without electrical contact with such materials, said apparatus consisting of:
   an oscillator circuit connected to single-plate capacitor means and driving same for producing a large, dispersed electrostatic field in the vicinity of a container;
   an operational amplifier, with the non-inverting input thereof connected to said oscillator circuit and said capacitor means, and outputting therefrom a DC voltage having a level which varies in proportion to changes to the electrostatic field, which is influenced by the relative amount of stored materials in the container; and
   indicator means, responsive to the level of said DC voltage, for indicating the amount of materials stored in the container.

20. A sensing apparatus as in claim 19, wherein said single-plate capacitor means comprises a segment of sensing wire.

21. A sensing apparatus as in claim 19, wherein said single-plate capacitor means comprises a metal surface sensor, the size and construction of which is selected for use with given container applications.

22. A sensing apparatus as in claim 19, wherein said capacitor means is associated with the container exteriorly thereto.

23. A sensing apparatus as in claim 19, wherein said capacitor means is associated with the container interiorly thereof.

24. A sensing apparatus as in claim 19, wherein oscillator circuit includes a junction FET with its gate connected to an inductance coil, its drain connected to a power supply, and its source connected to said capacitor means and to said operational amplifier non-inverting input.

* * * * *